(12) United States Patent
Kawada

(10) Patent No.: US 7,510,788 B2
(45) Date of Patent: *Mar. 31, 2009

(54) PERPENDICULAR MAGNETIC RECORDING MEDIUM UTILIZING A FIRST COBALT MAGNETIC LAYER AND A SECOND PD-SIO$_X$ LAYER AND METHOD OF MANUFACTURING SAME

(75) Inventor: Yasuyuki Kawada, Nagano (JP)

(73) Assignee: Fuji Electric Device Technology Co., Ltd. (JP)

( * ) Notice: Subject to any disclaimer, the term of this patent is extended or adjusted under 35 U.S.C. 154(b) by 372 days.

This patent is subject to a terminal disclaimer.

(21) Appl. No.: 11/069,920

(22) Filed: Mar. 1, 2005

(65) Prior Publication Data

US 2005/0202285 A1    Sep. 15, 2005

(30) Foreign Application Priority Data

Mar. 2, 2004    (JP) ............................. 2004-058230

(51) Int. Cl.
*G11B 5/66* (2006.01)
*G11B 5/673* (2006.01)
*C23C 14/08* (2006.01)

(52) U.S. Cl. .............. 428/828.1; 428/836.2; 428/836.3; 427/130; 204/192.2

(58) Field of Classification Search .................. None
See application file for complete search history.

(56) References Cited

U.S. PATENT DOCUMENTS

| | | | |
|---|---|---|---|
| 5,750,270 A | 5/1998 | Tang et al. | |
| 5,834,085 A | 11/1998 | Lairson et al. | |
| 6,248,416 B1 * | 6/2001 | Lambeth et al. | 428/832.2 |
| 6,596,418 B2 | 7/2003 | Maesaka et al. | |

(Continued)

FOREIGN PATENT DOCUMENTS

JP    2001-155329 A    6/2001

(Continued)

OTHER PUBLICATIONS

Singapore Search Report and Written Opinion issued in corresponding Singapore Patent Application No. SG200500634-1, with mailing date Feb. 21, 2007. The Search Report and Written Opinion were prepared by the Australian Patent Office.

(Continued)

*Primary Examiner*—Kevin M Bernatz
(74) *Attorney, Agent, or Firm*—Rossi, Kimms & McDowell LLP

(57) ABSTRACT

A perpendicular magnetic recording medium is disclosed that exhibits reduced media noise and enhanced thermal stability of recorded magnetization, and thus provides a medium of high recording density and excellent read-write performance. The perpendicular magnetic recording medium comprises a magnetic film on a nonmagnetic substrate. The magnetic film is a multilayered lamination film composed of alternately laminated first magnetic layers of cobalt and second magnetic layers of palladium, the second magnetic layers containing $SiO_2$. By setting a ratio of $Ku_2$ to $Ku$ to a value not smaller than a specified value, the compatibility between the ease of writing-in to the perpendicular magnetic recording medium by a head and the thermal stability of recorded magnetization is more improved.

19 Claims, 3 Drawing Sheets

U.S. PATENT DOCUMENTS

| | | | |
|---|---|---|---|
| 6,627,301 | B2 | 9/2003 | Shimizu et al. |
| 6,630,255 | B1 | 10/2003 | Litvinov et al. |
| 6,656,613 | B2 * | 12/2003 | Litvinov et al. ............ 428/827 |
| 6,743,503 | B1 | 6/2004 | Chen |
| 6,846,576 | B1 * | 1/2005 | Wu et al. .................... 428/611 |
| 6,869,688 | B2 * | 3/2005 | Usuki ........................ 428/611 |
| 6,953,629 | B2 * | 10/2005 | Hintz et al. ................. 428/827 |
| 7,033,686 | B2 * | 4/2006 | Hirayama et al. ........... 428/832 |
| 7,056,605 | B2 * | 6/2006 | Kawada ................... 428/832.1 |
| 2002/0037439 | A1 | 3/2002 | Litvinov et al. |
| 2002/0076579 | A1 | 6/2002 | Hanawa et al. |
| 2005/0052793 | A1 | 3/2005 | Hong et al. |
| 2005/0142378 | A1 * | 6/2005 | Nemoto et al. .............. 428/670 |
| 2005/0153169 | A1 * | 7/2005 | Watanabe et al. .... 428/694 BM |
| 2005/0196641 | A1 * | 9/2005 | Shibata ....................... 428/829 |
| 2005/0249984 | A1 * | 11/2005 | Ohmori et al. ........... 428/846.1 |
| 2006/0134467 | A1 * | 6/2006 | Hirayama et al. ........ 428/828.1 |

FOREIGN PATENT DOCUMENTS

| | | | |
|---|---|---|---|
| JP | 2001-291230 A | 10/2001 |
| JP | 2002-25032 A | 1/2002 |
| JP | 2002-197634 A | 7/2002 |
| JP | 2002-203306 A | 7/2002 |
| JP | 2002-334415 A | 11/2002 |
| JP | 2003-272122 A | 9/2003 |
| JP | 2003-281708 A | 10/2003 |
| JP | 2003-317223 A | 11/2003 |
| JP | 2005-190517 A | 7/2005 |
| JP | 2005-209303 A | 8/2005 |
| JP | 2005209303 A | 8/2005 |
| JP | 2005243093 A | 9/2005 |
| JP | 4079051 B2 | 2/2008 |
| WO | 03/071300 A1 | 8/2003 |

OTHER PUBLICATIONS

Notification of Reasons for Refusal issued in corresponding JP application No. 2004-058230, dated Jul. 25, 2008.

Notification of Reasons for Refusal issued in Japanese patent application No. 2004-048463 dated Oct. 21, 2008; corresponding to U.S. Appl. No. 11/063,232 dated Oct. 21, 2008. Partial translation provided.

Relevant portion of Search Report and Written Opinion issued in Application No. SG200304569-7 dated Apr. 29, 2005 from Australian Patent Office corresponding to related US Patent 7,056,605 B2 issued Jun. 6, 2006.

* cited by examiner

PERPENDICULAR MAGNETIC RECORDING MEDIUM UTILIZING A FIRST COBALT MAGNETIC LAYER AND A SECOND PD-SIO$_X$ LAYER AND METHOD OF MANUFACTURING SAME

CROSS REFERENCE TO RELATED APPLICATIONS

This application is based on, and claims priority to, Japanese Application No. 2004-058230, filed Mar. 2, 2004, the contents of which are incorporated by reference herein.

BACKGROUND OF THE INVENTION

A. Field of the Invention

The present invention relates to a perpendicular magnetic recording medium, in particular to a perpendicular magnetic recording medium that exhibits high recording density and excellent read-write performance. The invention also relates to a method of manufacturing such a medium.

B. Description of the Related Art

As a result of higher performance in personal computers and work stations in recent years, mounted magnetic recording devices having high capacity and small size are required. Thus, a magnetic disk of a recording device needs higher recording density.

Currently practicable magnetic recording systems are "in-plane (or longitudinal) magnetic recording systems," in which the axis of easy magnetization is parallel to the surface of the magnetic recording medium. To enhance magnetic recording density in this in-plane magnetic recording system, an enhancement of coercivity (Hc) is required as well as a reduction in the product of the residual magnetization (Br) and the thickness (t) of the magnetic film of the recording medium. Accordingly, attempts have been made to decrease the thickness and control the grain size of the magnetic film.

However, the in-plane magnetic recording system involves a problem in that the regeneration output decreases because the demagnetizing field increases with reduction of the bit length and decreases the residual magnetic flux density. In addition, "a problem of thermal fluctuation" becomes pronounced as grain size and thickness of the magnetic film are reduced. For these reasons, it is now deemed technically difficult to obtain a high density magnetic disk under the in-plane magnetic recording system.

To solve these problems and enhance the surface recording density, "a perpendicular magnetic recording system" has been studied. A magnetic recording medium in the perpendicular magnetic recording system is designed so the axis of easy magnetization of the magnetic film aligns perpendicular to the substrate surface. Since adjacent magnetizations in a magnetization transition region are not opposite to each other, the magnetization is stable even with a shortened bit length, and the magnetic flux is not decreased. Therefore, the perpendicular magnetic recording system is suitable for a magnetic recording system for a high density magnetic recording medium.

Contrary to this advantage, a perpendicular magnetic recording medium may exhibit high media noise that results from insufficient precipitation of nonmagnetic elements to a region between magnetic grains in the magnetic layer and thus, the magnetic interaction between the magnetic grains increases. Therefore, achieving high density recording that is accompanied by reduction of the media noise and enhancement of the SN ratio is desired, through development of a material control technology promoting the grain boundary precipitation of nonmagnetic elements.

A perpendicular magnetic recording medium called "a double layer perpendicular magnetic recording medium" is known that comprises a soft magnetic backing layer formed on a nonmagnetic substrate of aluminum or glass, an underlayer formed on the backing layer for perpendicular alignment of a magnetic layer, and a perpendicular magnetic recording layer and a protective layer that are formed on the underlayer. Various multilayer structures have been studied as the perpendicular magnetic layer, including perpendicular magnetic films of a cobalt-based alloy such as Co—Cr, Co—Cr—Ta, or Co—Cr—Pt, multilayer perpendicular magnetic films of Pt/Co and Pd/Co, and amorphous perpendicular magnetic films of Tb—Co and Tb—Fe—Co.

Among the multilayer structures, the multilayer perpendicular magnetic films of Pt/Co and Pd/Co are extensively studied for a future high recording density medium since this type of magnetic film exhibits large perpendicular magnetic anisotropy, high thermal stability, large coercivity, and in addition, a squareness ratio that easily approaches 1.0. These multilayered media, however, generate a large amount of so-called media noise, the reduction of which remains a problem to be solved before practical application.

To reduce the media noise, a granular layer has been applied to the underlayer. Besides this, Japanese Unexamined Patent Application Publication No. 2002-025032 discloses a perpendicular magnetic recording medium that contains boron or oxygen in the multilayer perpendicular magnetic film composed of alternately laminated Co and Pt films or Co and Pd films.

The perpendicular magnetic recording medium disclosed in Japanese Unexamined Patent Application Publication No. 2002-025032, however, causes deterioration of thermal stability of the recorded magnetization since the addition of boron or oxygen to the cobalt layer, platinum layer or palladium layer in the multilayer lamination film causes a decrease of the perpendicular magnetic anisotropy constant Ku (also called simply "Ku" in this specification). It is consequently important to reduce the media noise while keeping the perpendicular magnetic anisotropy constant Ku sufficiently large, to ensure thermal stability.

As is clarified above, the perpendicular magnetic recording medium still involves problems to be solved, although the type of medium is deemed promising for achieving high density recording. Especially, thermal stability must be improved while simultaneously reducing media noise. The present invention is directed to overcoming or at least reducing the effects of one or more of the problems set forth above.

SUMMARY OF THE INVENTION

The present invention has been made in view of the above problems, and an object of the invention is to provide a perpendicular magnetic recording medium that exhibits high recording density and excellent read-write performance with improved thermal stability of the recorded magnetization as well as reduced media noise. Another object of the invention is to provide a method of manufacturing such a medium.

To achieve these and other objects, there is provided a perpendicular magnetic recording medium that comprises a magnetic film provided on a nonmagnetic substrate and is characterized in that the magnetic film is composed of alternately laminated first magnetic layers of cobalt layers and second magnetic layers of palladium layers, the second magnetic layer containing silicon oxide.

The perpendicular magnetic recording medium preferably is characterized by crystalline magnetic anisotropy energy of the magnetic film that is approximated by $E \approx Ku_1 \sin^2\theta + Ku_2 \sin^4\theta$. $Ku_1$ and $Ku_2$ are uniaxial anisotropy constants, $\theta$ is an angle between spontaneous magnetization and an axis of easy magnetization of the magnetic film, and a crystalline magnetic anisotropy constant Ku holds a relation $Ku=Ku_1+Ku_2$. The Ku and the $Ku_2$ obtained by magnetic anisotropy measurement using a torque magnetization meter under a condition of approximately saturated magnetization of the magnetic film satisfy a relation $Ku_2/Ku \geqq 0.25$.

In a preferred embodiment, the perpendicular magnetic recording medium comprises an amount of added silicon oxide in the concentration range of 2 to 8 mol %.

The perpendicular magnetic recording medium preferably has a thickness of the first magnetic layer that is in the range of 0.2 to 0.5 nm and a thickness of the second magnetic layer that is in the range of 0.6 to 1.0 nm.

The perpendicular magnetic recording medium may include an underlayer that is provided between the magnetic film and the substrate, and the magnetic film may be disposed directly on the underlayer. The underlayer preferably is a ruthenium film. Preferably the thickness of the underlayer is in the range of 5 to 20 nm, and a surface of the underlayer is adsorbed with oxygen.

The perpendicular magnetic recording medium also may include an alignment control layer that is provided between the substrate and the underlayer for C-axis alignment of crystal alignment of the underlayer. The alignment control layer may be composed by laminating a first alignment control layer and a second alignment control layer. The first alignment control layer may be a tantalum layer and the second alignment control layer may be selected from a NiFeNbB layer, a NiFeCr layer, and a NiFeSi layer. Composition of the NiFeNbB layer preferably is in the range of 64 to 86 at % Ni, 10 to 20 at % Fe, 2 to 10 at % Nb, and 2 to 6 at % B; composition of the NiFeCr layer preferably is in the range of 50 to 70 at % Ni, 10 to 20 at % Fe, 20 to 30 at % Cr; composition of the NiFeSi layer preferably is in the range of 70 to 88 at % Ni, 10 to 20 at % Fe, 2 to 10 at % Si; and a total of the compositions of elements composing each second alignment control layer is 100%. The thickness of the first alignment control layer preferably is in the range of 1 to 5 nm and the thickness of the second alignment control layer preferably is in the range of 5 to 30 nm.

The perpendicular magnetic recording medium may further comprise a soft magnetic backing layer that is provided between the substrate and the first alignment control layer. The backing layer preferably is composed of an alloy of CoZrNb or CoZrTa, and has a thickness in the range of 50 to 300 nm.

A method of manufacturing a perpendicular magnetic recording medium according to the invention comprises depositing an underlayer of a ruthenium film on a nonmagnetic substrate, and depositing a magnetic film of multilayered lamination film directly on the underlayer by alternately laminating first magnetic layers of cobalt layers and second magnetic layers of palladium layers containing silicon oxide. Preferably, depositing of the magnetic film is conducted by a sputtering method using a target of cobalt and a target of palladium containing silicon oxide in a concentration range of 2 to 8 mol %. When depositing the underlayer, oxygen may be adsorbed on a surface of the underlayer by exposing the surface of the underlayer to argon gas at a gas pressure in the range of 0.1 to 10 Pa containing oxygen in the mass flow range of 1 to 10% for a time duration in the range of 1 to 10 sec.

The method may further comprise, prior to the underlayer deposition, depositing of an alignment control layer comprising a first alignment control layer of tantalum and a second alignment control layer of a layer selected from an NiFeNbB layer, an NiFeCr layer, and an NiFeSi layer. These are deposited for aligning crystal alignment of the underlayer in C-axis alignment. The first alignment control layer and the second alignment control layer are laminated. Prior to depositing the alignment control layer, a backing layer comprising a soft magnetic backing layer of a CoZrNb layer or a CoZrTa layer may be deposited on the substrate.

As described above, in the perpendicular magnetic recording medium of the invention, a magnetic film is a multilayer lamination film composed of alternately laminated first magnetic layers of cobalt layers and second magnetic layers of palladium layers, the second magnetic layer containing silicon oxide. Consequently, thermal stability of magnetization recorded in the perpendicular magnetic recording medium is improved and excellent recording and regeneration performance is achieved. With the ratio of $Ku_2$ to Ku of at least a specified value, the ease of writing to a perpendicular magnetic recording medium by a head and the thermal stability of recorded magnetization are improved at the same time.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

Figure 1:
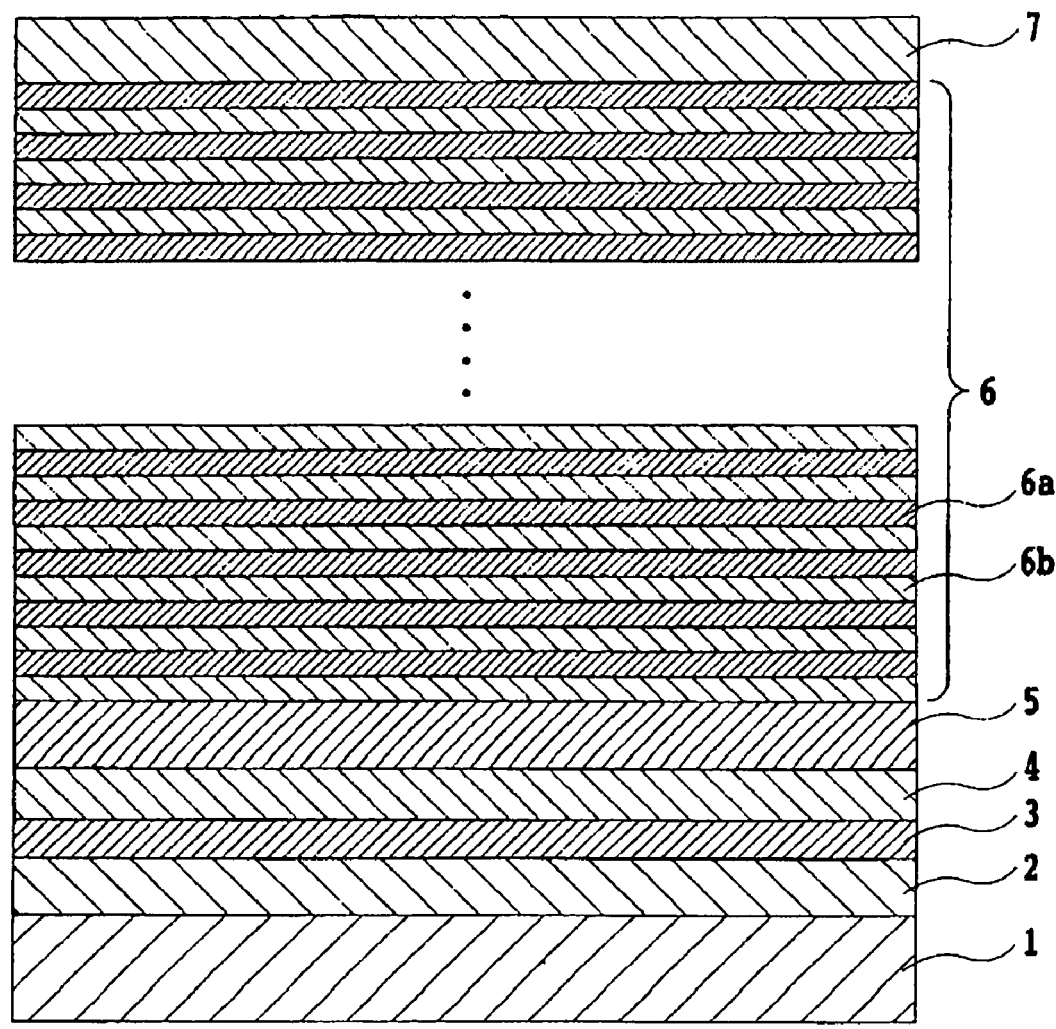
FIG. 1 illustrates an example of structure of a perpendicular magnetic recording medium according to an embodiment of the invention.

A conventional perpendicular magnetic recording medium, although it has many advantages for a high density recording medium, has insufficient precipitation of a nonmagnetic substance to a region between magnetic grains in the magnetic layer, so that interaction between the magnetic grains is large, leading to high media noise.

To address this problem, a perpendicular magnetic recording medium is manufactured in which the basic structure of the multilayer perpendicular magnetic film is Co/Pd, and the cobalt layer contains $SiO_2$. In the cobalt layer that contains $SiO_2$, the nonmagnetic $SiO_2$ precipitates between the cobalt particles. As a result, the cobalt particles are fine and isolated, thereby reducing media noise. Since the reduction of media noise raises SN ratio, read-write performance can be improved and high density recording can be attained. In addition to the reduction in media noise, a perpendicular magnetic recording medium also should exhibit excellent recording and regeneration performance and improvement in thermal stability of the recorded magnetization.

The present invention has been carried out in view of the above study items. Some preferred embodiments of the invention are described in the following.

In one embodiment of the invention a perpendicular magnetic recording medium comprises a multilayered lamination film that is composed of alternately laminated first magnetic layers of cobalt and second magnetic layers of palladium, the palladium layers containing silicon oxide. By adding the silicon oxide in the palladium layers and laminating the palladium layers and the cobalt layers, the crystalline magnetic anisotropy constant Ku is increased. Further, a uniaxial anisotropy constant $Ku_2$ is also increased.

The principle of the invention will now be described. To improve thermal stability of magnetization recorded in a perpendicular magnetic recording medium, the perpendicular magnetic anisotropy constant Ku must be increased. The increase of the perpendicular magnetic anisotropy constant Ku, however, generally accompanies an increase of coercivity Hc and a switching field Hk. Since values of coercivity Hc or the switching field Hk that are too large cause difficulty in writing-in onto the magnetic recording medium by a head, the value must be in an appropriate range. Ku is given by $Ku=Ku_1+Ku_2$, where each of $Ku_1$ and $Ku_2$ is a uniaxial anisotropy constant (also called "$Ku_1$" and "$Ku_2$" in this specification). The switching field in the process of recording into a magnetic recording medium is given by $Hk=2Ku_1/Ms$, where Ms is saturation magnetization. Consequently, a small value of the $Ku_1$ results in a small Hk, thus making it easy to write into the magnetic recording medium.

On the other hand, to improve thermal stability of the recorded magnetization, a large Ku value is favorable. Magnetization, recorded in the magnetic recording medium, of a magnetic grain with a volume V has a magnetic anisotropy energy represented by KuV. Thermal energy in the environment at an absolute temperature T is represented by kT, where k is the Boltzmann constant. Consequently, thermal stability can be represented by KuV/kT, which indicates that the Ku value should be large for improving thermal stability. Therefore, $Ku_1$ should be small to obtain excellent read-write performance, and Ku should be large for improving thermal stability of recorded magnetization.

Because $Ku=Ku_1+Ku_2$, $Ku_1$ can be small if $Ku_2$ is large, even with a large Ku value. Therefore, when Ku is large and the proportion of $Ku_2$ in Ku is large, thermal stability of the recorded magnetization is improved and, at the same time, the switching field remains in a proper range, thus achieving excellent read-write performance. In perpendicular magnetic recording media that are manufactured in various conditions but have an equal Ku value, it is important to make the $Ku_2$ value large and the proportion of $Ku_2$ in Ku large.

To improve thermal stability of the recorded magnetization and retain the Hk in a proper range, the larger the proportion of the uniaxial anisotropy constant $Ku_2$ in the perpendicular magnetic anisotropy constant Ku the more favorable. Specifically, $Ku_2/Ku$ is preferably at least 25%.

To achieve excellent read-write performance while at the same time improving thermal stability of the recorded magnetization, that is, in order to hold a large value of perpendicular magnetic anisotropy constant Ku and at the same time to make a uniaxial anisotropy constant $Ku_2$ large, the magnetic film of a perpendicular magnetic recording medium of an embodiment of the invention is, as shown in FIG. 1, a multilayered lamination film composed of cobalt layers and palladium layers that contain silicon oxide.

FIG. 1 illustrates a concept of a basic structure of a perpendicular magnetic recording medium of an embodiment of the invention. The medium comprises backing layer 2, alignment control layers 3 and 4, underlayer 5, and magnetic film 6 sequentially laminated on nonmagnetic substrate 1 of aluminum, glass, or the like. On magnetic film 6, protective layer 7 is provided.

In the perpendicular magnetic recording medium of an embodiment of the invention, magnetic film 6 has a basic structure of a multilayered lamination film composed of multiple cobalt layers and palladium layers, the palladium layers containing silicon oxide. Magnetic film 6 is formed on an underlayer that is provided for reducing magnetic interaction between magnetic grains constructing magnetic film 6. Underlayer 5 preferably is composed of a ruthenium film, though a Pt film, a Pd film, and a Pt/Pd lamination film can also be used. The composition of the silicon oxide contained in magnetic film 6 is preferably a stoichiometric composition, that is, in the composition $SiO_x$ ($0<x\leq 2$), $SiO_2$ is preferable. Backing layer 2 and alignment control layers 3 and 4 are preferably provided between underlayer 5 and substrate 1 to enhance crystal alignment (C-axis alignment) of underlayer 5. A perpendicular magnetic recording medium without these layers is also possible.

More specifically, underlayer 5 is composed of a ruthenium film having an hcp (hexagonal closest packed) crystal structure. The thickness is in the range of 5 to 20 nm. When the surface of underlayer 5 is subjected to oxygen adsorption treatment before forming magnetic film 6, magnetic performance of magnetic film 6 can be improved. The oxygen adsorption on the surface of underlayer 5 suppresses magnetic interaction between magnetic grains in magnetic film 6 formed on underlayer 5 and makes a gradient a (also called simply "a" in this specification) of a magnetization curve around Hc less steep, to facilitate reading and writing. The oxygen adsorption to underlayer 5 is conducted after formation of the underlayer by exposing the surface of the underlayer to argon gas containing 1 to 10% of oxygen in mass flow proportion at a pressure of 0.1 to 10 Pa for 1 to 10 seconds.

The α is an index representing magnitude of magnetic interaction between magnetic grains composing magnetic film 6. A small a means little magnetic interaction between the magnetic grains and thus, little media noise.

Magnetic film 6 has a basic structure of a multilayered lamination film of Co/Pt. The multilayered lamination film consists of first magnetic layers 6a of cobalt layers containing no additive and second magnetic layers 6b of palladium layers containing an additive of silicon oxide ($SiO_x$). The multilayered lamination film has a composition of Co/Pd—$SiO_2$, for example. The $SiO_2$ in the palladium layer of an embodiment of the invention is preferably contained in the concentration range of 2 to 8 mol %. A thickness of the cobalt layer is in the range of 0.2 to 0.5 nm, and a thickness of the palladium layer is in the range of 0.6 to 1.0 nm.

By including no additive in the cobalt layer and $SiO_2$ in the palladium layer, and laminating these layers, a crystalline magnetic anisotropy constant Ku is large and a uniaxial anisotropy constant $Ku_2$ also is large. As a result, thermal stability of the recorded magnetization is improved and switching field Hk is kept in an appropriate range, achieving excellent reading and writing performance.

By adding $SiO_2$ in the palladium layer, the nonmagnetic $SiO_2$ precipitates between the magnetic grains making the particles minute and isolated. Therefore, the coercivity Hc is held in a proper range and the media noise is reduced.

Underlayer 5 with oxygen adsorbed on the surface thereof is provided in a perpendicular magnetic recording medium of an embodiment of the invention for the purpose of controlling the gradient a of a magnetization curve around coercivity (Hc) of magnetic film 6 formed on underlayer 5. The magnetic film is composed of a multilayered lamination film of Co/Pt for the purpose of forming a magnetic film with a higher Hc and with a squareness ratio readily approaching 1 as compared with a magnetic film of a Co—Cr alloy, and also obtaining large crystalline magnetic anisotropy by taking advantage of interface magnetic anisotropy. Large crystalline magnetic anisotropy not only improves thermal stability of recorded magnetization, but also aligns the axis of easy magnetization perpendicularly to the magnetic film surface easily, increases the coercivity for the perpendicular magnetic field, and facilitates retaining a residual magnetization.

Alignment control layers 3 and 4 are provided for the purpose of enhancing crystal alignment (C-axis alignment) of underlayer 5 of a ruthenium layer.

The alignment control layers have preferably a double layer structure consisting of first alignment control layer 3 of tantalum and second alignment control layer 4 of NiFeNbB. The second alignment control layer can also be a NiFeCr layer or a NiFeSi layer. By enhancing C-axis alignment of underlayer 5, crystal alignment of magnetic film 6 formed on underlayer 5 also is improved, thereby improving magnetic performance of magnetic film 6. Thickness of first alignment control layer 3 of tantalum is in the range of 1 to 5 nm, and thickness of second alignment control layer 4 of a NiFeNbB layer, a NiFeCr layer, or a NiFeSi layer is in the range of 5 to 30 nm. A composition of the NiFeNbB layer is in the range of 64 to 86 at % Ni, 10 to 20 at % Fe, 2 to 10 at % Nb, and 2 to 6 at % B. A composition of the NiFeCr layer is in the range of 50 to 70 at % Ni, 10 to 20 at % Fe, and 20 to 30 at % Cr. A composition of the NiFeSi layer is in the range of 70 to 88 at % Ni, 10 to 20 at % Fe, and 2 to 10 at % Si. Here, the total of compositions of the elements for each layer is 100%.

Backing layer 2 is provided for the purpose of enhancing writing capability by a recording head. The backing layer can be, for example, a soft magnetic film of CoZrNb or CoZrTa having thickness of 50 to 300 nm.

As described above, in an embodiment of the invention, a magnetic film has a basic structure of a multilayered lamination film of Co/Pd and consists of first magnetic layers of cobalt containing no additive and second magnetic layers of palladium containing an additive of $SiO_2$. As a result, a perpendicular magnetic anisotropy constant Ku is large and a proportion of a uniaxial anisotropy constant $Ku_2$ in the Ku is large as well. Therefore, thermal stability of magnetization recorded in a perpendicular magnetic recording medium is improved and excellent read-write performance is achieved as well. Since the nonmagnetic $SiO_2$ is locally distributed in second magnetic layer 6b, magnetic interaction between the magnetic grains is decreased, reducing media noise.

In addition, by virtue of ruthenium underlayer 5 with oxygen adsorption on the surface thereof, the gradient a of a magnetization curve around Hc is less steep and magnetic interaction between the grains in magnetic film 6 is decreased, facilitating reading and writing.

The present invention is described more in detail according to some specific embodiment examples. Needless to say, the invention shall not be limited to the specific examples, but various modifications are possible within the spirit and scope of the invention.

EXAMPLE 1

A perpendicular magnetic recording medium of Example 1 comprises substrate 1 of glass, backing layer 2 of a CoZrNb film, first alignment control layer 3 of tantalum, second alignment control layer 4 of a NiFeNbB layer, underlayer 5 of ruthenium, protective layer 7 of a nitrogen-doped carbon film, and magnetic film 6 of a multilayered lamination film consisting of first magnetic layers 6a of cobalt layers with a composition of cobalt and second magnetic layers 6b of Pd—$SiO_2$ layers with a composition of Pd—$SiO_2$.

A manufacturing method of the perpendicular magnetic recording medium is as follows. Substrate 1 is a glass substrate having a thickness of 0.635 mm and a diameter of 2.5 inches. However, the diameter and the thickness are not essential, and the material is not essential either; an aluminum substrate can also be used for substrate 1.

After cleaning the substrate well, a soft magnetic layer of a CoZrNb film was deposited by a sputtering method to form backing layer 2. The sputtered target used in this example had a composition of 87 at % Co-5 at % Zr-8 at % Nb. Using a sputtering gas of argon, a film about 200 nm thick was deposited under argon gas pressure of about 1 Pa at room temperature. The CoZrNb film exhibits satisfactory soft magnetic characteristic even though in an amorphous condition deposited at room temperature.

On this CoZrNb film, first alignment control layer 3 of tantalum was sputtered, using a target of pure tantalum. A film 3 nm thick was deposited by sputtering with argon gas at room temperature under gas pressure of about 1 Pa. On this tantalum film, second alignment control layer 4 of NiFeNbB was subsequently deposited by sputtering. The composition of the target used was 79 at % Ni-12 at % Fe-3 at % Nb-6 at % B. A film about 25 nm thick was deposited by sputtering with argon gas at room temperature under gas pressure of about 1 Pa.

Thus deposited alignment control layers 3 and 4 were used to obtain an hcp crystal structure in underlayer 5 of a ruthenium layer to be deposited in the subsequent step. For the purpose of increasing coercivity by C-axis alignment of the crystals of ruthenium underlayer 5, first alignment control layer 3 of tantalum and second alignment control layer 4 of NiFeNbB were used for crystal alignment control.

On the thus deposited NiFeNbB layer, underlayer 5 of a ruthenium film was deposited by sputtering. The target used was pure ruthenium. A film about 10 nm thick was deposited by sputtering with argon gas. The deposition temperature was room temperature and the gas pressure was about 4 Pa. The surface of the thus deposited ruthenium underlayer 5 having the hcp crystal structure was exposed to an atmosphere of argon gas containing oxygen in a mass flow fraction of 2% under a pressure of 1 Pa for 10 sec, to adsorb an appropriate amount of oxygen on the ruthenium surface.

By using underlayer 5 of ruthenium with oxygen adsorbed thereon, the gradient of magnetization curve around Hc is less steep and magnetic interaction between the grains in the perpendicular magnetic film is reduced, to facilitate recording and regeneration.

On the ruthenium underlayer, perpendicularly aligned magnetic film 6 of a multilayered lamination film of Co/Pd—$SiO_2$ was formed by sputtering. Targets used were a target of pure cobalt and a target of palladium containing 5 mol % of $SiO_2$. By discharging and sputtering these two targets simultaneously while rotating, each of the cobalt layers and each of the Pd—$SiO_2$ layers were alternately laminated. The composition of the deposited Pd—$SiO_2$ layer was 95 mol % Pd-5 mol % $SiO_2$ reflecting the target used. Argon gas was used for the sputtering. Thickness of the cobalt layer was 0.3 nm and thickness of the Pd—$SiO_2$ layer was 0.8 nm. The deposition was conducted at room temperature and under gas pressure of 5 Pa.

By using magnetic film 6 of a multilayered lamination film of Co/Pd—$SiO_2$ composed of alternately laminated first magnetic layers 6a of cobalt layers and second magnetic layers of Pd—SiO$_2$ layers, the Ku value is increased and the proportion of Ku$_2$ in the Ku is increased. By adding SiO$_2$ in palladium, the nonmagnetic SiO$_2$ precipitates between the palladium particles making the palladium particles minute and isolated.

Finally, protective layer 7 of a nitrogen-doped carbon (C:N) film was deposited by sputtering. The target used was carbon. A film about 7 nm thick was formed by sputtering with argon gas in the atmosphere of argon gas containing nitrogen gas in a mass flow fraction of 4%. The deposition was conducted at room temperature and under gas pressure of about 1 Pa.

Thus, a perpendicular magnetic recording medium was manufactured comprising a magnetic film of a multilayered lamination film of Co/95 mol % Pd-5 mol % SiO$_2$.

Figure 2:
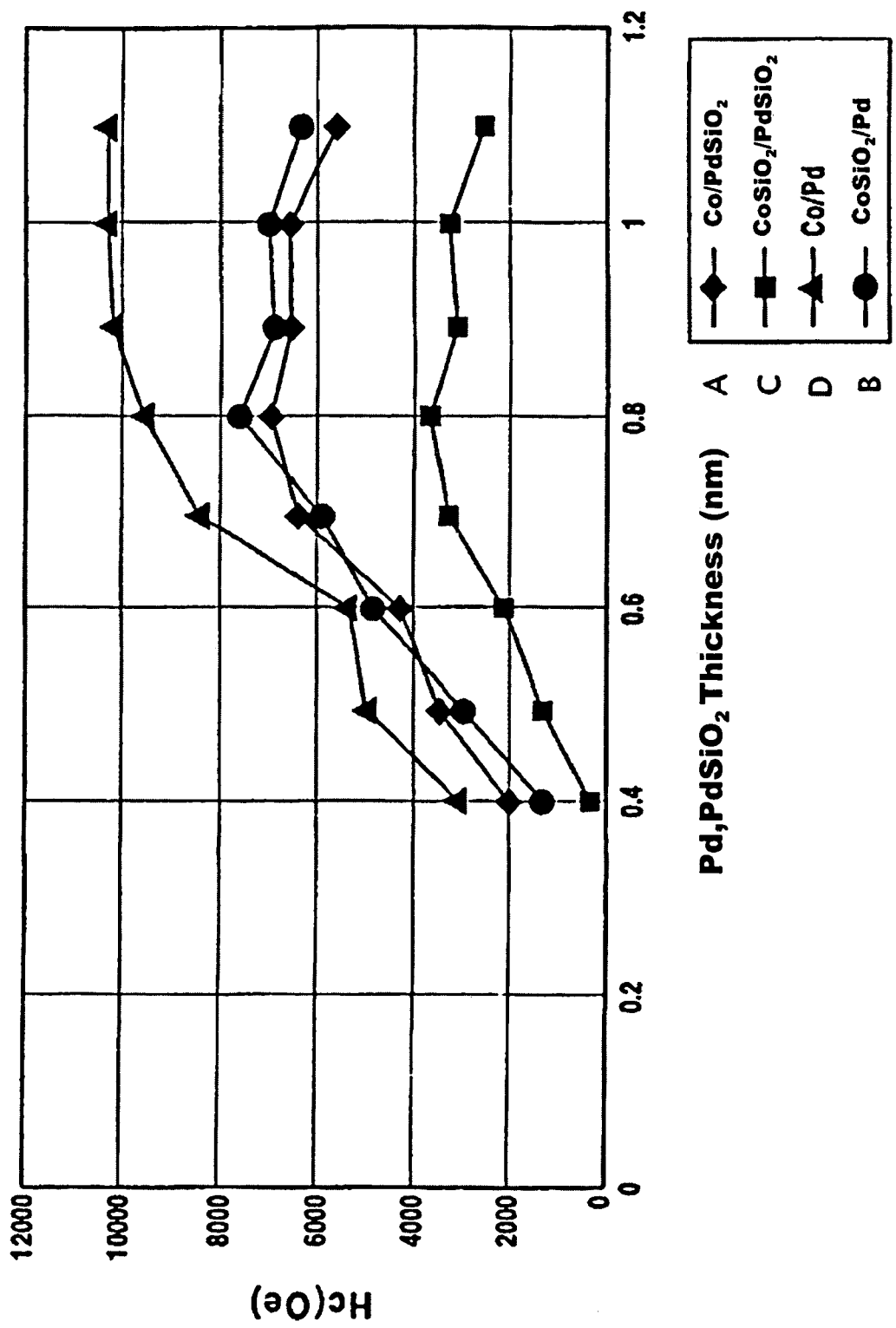
FIG. 2 illustrates the coercivity Hc of perpendicular magnetic recording media provided with a multilayered lamination film composed of Co layers or Co—$SiO_2$ layers and Pd layers or Pd—$SiO_2$ layers in the dependence on the thickness of the Pd layer or Pd—$SiO_2$ layer.

FIG. 2 illustrates coercivity Hc in the dependence on the thickness of a palladium layer or the Pd—SiO$_2$ layer of the perpendicular magnetic recording media each comprising a magnetic film of a multilayered lamination film. Each medium comprises a magnetic film of a multilayered lamination film of Co/95 mol % Pd-5 mol % SiO$_2$ (in medium A), 94 mol % Co-6 mol % SiO$_2$/Pd (in medium B), 94 mol % Co-6 mol % SiO$_2$/95 mol % Pd-5 mol % SiO$_2$ (in medium C), or pure Co/pure Pd (in medium D). In FIG. 2, the ordinate represents the coercivity Hc and the abscissa represents the thickness of the palladium layer or the Pd—SiO$_2$ layer.

The perpendicular magnetic recording media B, C, and D were manufactured in the same compositions and deposition processes as in medium A except for the construction of the magnetic film described above.

FIG. 2 shows that the Hc increases in all of the four types of media up to the thickness of 0.8 nm of the Pd or Pd—SiO$_2$ film. At this thickness of 0.8 nm, Hc of medium C is about 4,000 Oe. Medium A according to the invention exhibits the Hc value of about 7,000 Oe, which is sufficient for performing excellent recording and regeneration. The Hc of medium B is about 7,500 Oe. Medium D, which does not contain SiO$_2$ in the cobalt layer and in the palladium layer, resulted in an Hc value of 10,000 Oe that was too large. When the Hc value is excessively large, a magnetic field generated by a ring head for reading and writing is insufficient for reversing the magnetization direction, and thus adequate reading and writing cannot be performed.

In a perpendicular magnetic recording medium comprising a multilayered lamination film basically composed of cobalt layers and palladium layers, the magnitude of Hc can be controlled by addition or no addition of the SiO$_2$ into the cobalt layers and the palladium layers as described above. Medium A according to the invention exhibits an Hc value that is not too large, not too small, and just appropriate, to obtain an excellent read-write characteristic.

EXAMPLE 2

Figure 3:
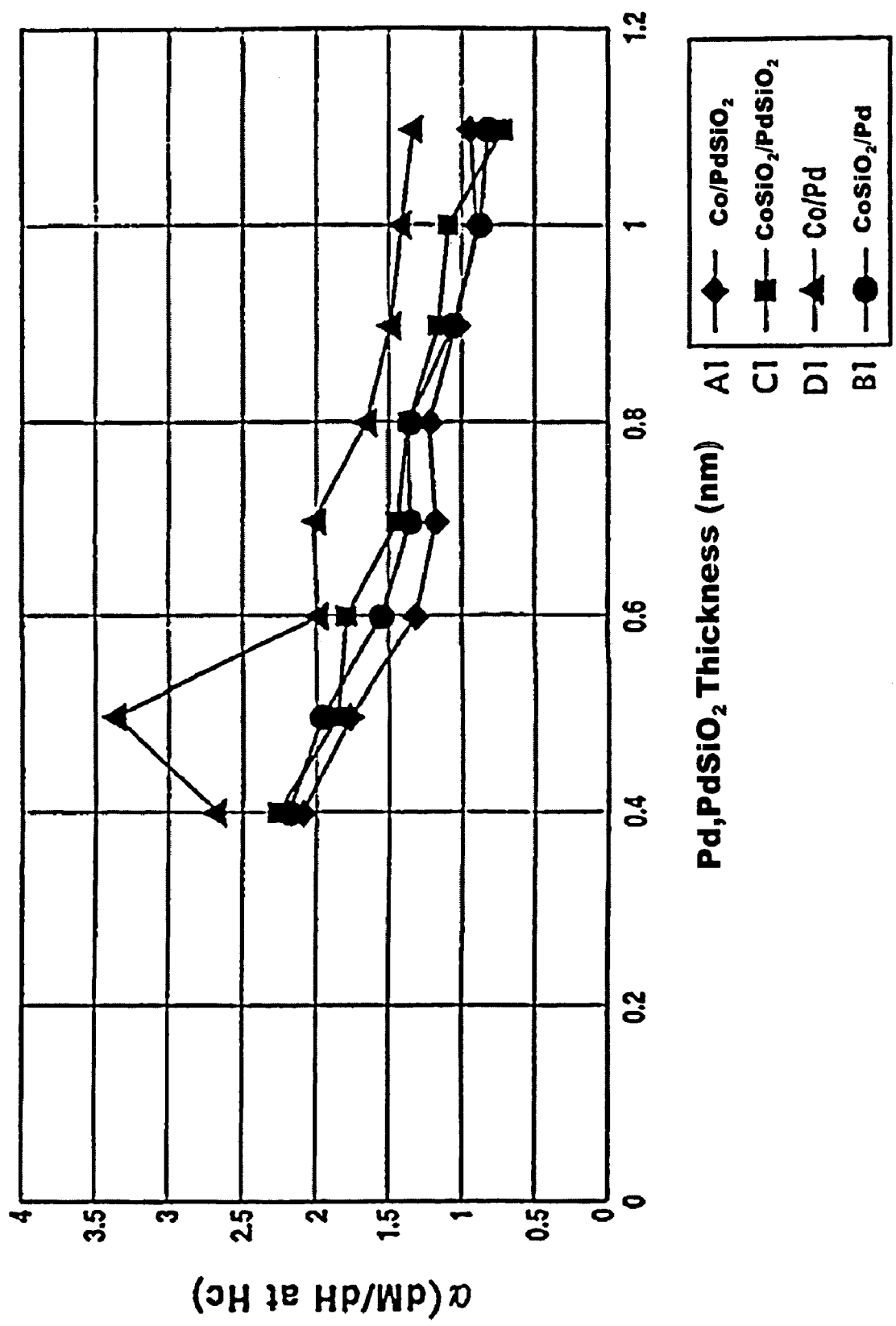
FIG. 3 illustrates the gradient a of the magnetization curve at the vicinity of Hc of perpendicular magnetic recording media provided with a multilayered lamination film composed of Co layers or Co—$SiO_2$ layers and Pd layers or Pd—$SiO_2$ layers in the dependence on the thickness of the Pd layer or Pd—$SiO_2$ layer.

FIG. 3 illustrates gradient a around Hc in a magnetization curve in the dependence on the thickness of a palladium layer or a Pd—SiO$_2$ layer of the perpendicular magnetic recording media each comprising a magnetic film of a multilayered lamination film. Each medium comprises a magnetic film of a multilayered lamination film of Co/95 mol % Pd-5 mol % SiO$_2$ (in medium A$_1$), 94 mol % Co-6 mol % SiO$_2$/Pd (in medium B$_1$), 94 mol % Co-6 mol % SiO$_2$/95 mol % Pd-5 mol % SiO$_2$ (in medium C$_1$), or pure Co/pure Pd (in medium D$_1$). In FIG. 3, the ordinate represents the gradient a and the abscissa represents the thickness of the Pd or Pd—SiO$_2$ layer. The gradient a of a magnetization curve is an index representing the magnitude of magnetic interaction between magnetic grains composing magnetic film 6, and is favorably a small value.

Medium A$_1$ according to the invention in this Example 2 was manufactured in the same method and conditions as in Example 1, and the description is omitted. The perpendicular magnetic media of B$_1$, C$_1$, and D$_1$ were manufactured with the same composition and through the same deposition processes as in medium A$_1$ except for the construction of the magnetic films as described above.

FIG. 3 shows that the thicker the Pd or the Pd—SiO$_2$ film is, the smaller the a value is, in all four types of media. While medium D$_1$ resulted in a values not smaller than 1.5 in the range of thickness not larger than 0.9 nm, media A$_1$, B$_1$, and C$_1$ show smaller a values than medium D$_1$ in the whole thickness range, and the a values of the media A$_1$, B$_1$, and C, are approximately of the same magnitude. Thus, addition of SiO$_2$ into the cobalt layers or the palladium layers in a perpendicular magnetic recording medium comprising a multilayered lamination film basically composed of cobalt layers and palladium layers, suppresses magnetic interaction between magnetic grains, and results in a reduction of media noise.

EXAMPLE 3

Table 1 shows measurements of the perpendicular magnetic anisotropy constant Ku, the uniaxial anisotropy constants Ku$_1$ and Ku$_2$, and the ratio of Ku$_2$ to Ku, that is, Ku$_2$/Ku, on the perpendicular magnetic recording media, each of which comprises a magnetic film of a multilayered lamination film. Each medium comprises a magnetic film of a multilayered lamination film of Co/95 at % Pd-5 mol % SiO$_2$ (in medium A$_2$), 94 mol % Co-6 mol % SiO$_2$/Pd (in medium B$_2$), 94 mol % Co-6 mol % SiO$_2$/95 mol % Pd-5 mol % SiO$_2$ (in medium C$_2$), or pure Co/pure Pd (in medium D$_2$).

Medium A$_2$ according to the invention in this Example 3 was manufactured in the same method and conditions as in Example 1, and the description is omitted. The perpendicular magnetic recording media of B$_2$, C$_2$ and D$_2$ were manufactured with the same composition and through the same deposition processes as in medium A$_2$ except that the magnetic films had the constructions as described above, and the thickness of the Co or Co—SiO$_2$ layer composing the multilayered lamination film was 0.3 nm and the thickness of the Pd or Pd—SiO$_2$ layer was 0.8 nm.

In this Example 3, the Ku and Ku$_2$ were obtained depending on applied magnetic field by a method described below. A magnetic torque curve was measured in the dependence on applied magnetic field H in the range of 10 kOe to 25 kOe using a torque magnetometer under a condition of approximately saturated magnetization of the magnetic film. Fourier analysis was carried out on this magnetic torque curve. Using an approximation relation on the crystalline magnetic anisotropy energy E of the magnetic film: E≈Ku$_1$ sin$^2$θ+Ku$_2$ sin$^4$θ (θ is an angle between the spontaneous magnetization and the axis of easy magnetization of the magnetic film), the Ku and Ku$_2$ were derived. Thus obtained Ku and Ku$_2$ were plotted against the reciprocal of the applied magnetic field (1/H) and straight lines were obtained as an approximation. From the approximation line of Ku versus 1/H, the Ku value was determined as the sum of the value of Ku at 1/H=0 (the section with the ordinate of the extrapolated straight line) and 2πMs$^2$ (Ms is the saturation magnetization). The Ku$_2$ was defined by the extrapolated value itself of the above-described straight line. From the relation Ku=Ku$_1$+Ku$_2$, the Ku$_1$ value was determined as Ku−Ku$_2$.

TABLE 1

|  | Ku (erg/cm³) | Ku$_1$ (erg/cm³) | Ku$_2$ (erg/cm³) | Ku$_2$/Ku (%) |
|---|---|---|---|---|
| medium A$_2$ | $5.1 \times 10^6$ | $3.76 \times 10^6$ | $1.38 \times 10^6$ | 27.1 |
| medium B$_2$ | $3.6 \times 10^6$ | $2.84 \times 10^6$ | $0.73 \times 10^6$ | 20.3 |
| medium C$_2$ | $2.1 \times 10^6$ | $1.83 \times 10^6$ | $0.24 \times 10^6$ | 11.5 |
| medium D$_2$ | $3.8 \times 10^6$ | $2.95 \times 10^6$ | $0.82 \times 10^6$ | 21.8 |

Table 1 clearly shows that the Ku is largest in medium A$_2$ according to the invention. Because thermal stability of recorded magnetization is represented by KuV/kT, medium A$_2$, exhibiting the largest Ku value, is the best in the thermal stability of recorded magnetization.

Table 1 also shows that the Ku values of medium A$_2$ and medium D$_2$ without addition of SiO$_2$ in the cobalt layer are larger than the Ku values of medium B$_2$ and medium C$_2$ with addition of SiO$_2$ in the cobalt layer in the multilayered lamination film basically composed of cobalt layers and palladium layers. Therefore, SiO$_2$ is advantageously not added in the cobalt layer for the thermal stability of recorded magnetization.

The ratio Ku$_2$/Ku is the largest in medium A$_2$ according to the invention, while simultaneously achieving the highest Ku. Since a switching field Hk in a recording process is represented by Hk=2Ku$_1$/Ms as described previously, only the Ku$_1$ affects the switching field Hk. On the other hand, thermal stability of recorded magnetization depends on Ku=Ku$_1$+Ku$_2$. Therefore, by making the Ku value large and the Ku$_2$ value also large, that is, making the Ku value large and the ratio Ku$_2$/Ku large, writing-in to a perpendicular magnetic recording medium is facilitated and thermal stability of recorded magnetization is improved.

EXAMPLE 4

Table 2 shows the read-write performances of SN ratio (SNR) and OW (overwrite) characteristics obtained on perpendicular magnetic recording media each comprising a magnetic film of a multilayered lamination film. Each medium comprises a magnetic film of a multilayered lamination film of Co/95 at % Pd-5 mol % SiO$_2$ (in medium A$_3$), 94 mol % Co-6 mol % SiO$_2$/Pd (in medium B$_3$), or pure Co/pure Pd (in medium C$_3$).

Medium A$_3$ according to the invention in this Example 3 was manufactured in the same method and conditions as in Example 1, and the description is omitted. The perpendicular magnetic recording media of B$_3$ and C$_3$ were manufactured in the same composition and through the same deposition processes as in medium A$_3$, except that the magnetic films had the constructions as described above, and the thickness of the Co or Co—SiO$_2$ layer composing the multilayered lamination film was 0.3 nm.

Evaluation of SNR was conducted at the linear recording density of 470 kFCl using a ring head for an in-plane medium. Evaluation of two OW characteristics OW1 and OW2 were made on the perpendicular magnetic recording media. The OW1 is an OW characteristic in the case high linear recording density signals are written-in over low linear recording density signals. Evaluation of the OW1 was conducted by overwriting high linear recording density signals over signals that were written with a low linear recording density and taking the ratio of the initially written low linear recording density signals to the low linear recording density signals remaining after the overwriting process. Recording densities used in the evaluation of the OW1 were 53.5 kFCl (12T) for the low linear recording density and 642 kFCl (1T) for the high linear recording density. The OW2 is an OW characteristic in the case low linear recording density signals are written-in over high linear recording density signals. Evaluation of the OW2 was conducted, similarly to the evaluation of the OW1, by taking the ratio of the initially written high linear recording density signals to the high linear recording density signals remaining after the overwriting process. Recording densities used in the evaluation of the OW2 were 321 kFCl (2T) for the high linear recording density and 42.8 kFCl (15T) for the low linear recording density.

TABLE 2

|  | OW1 (dB) | OW2 (dB) | SNR (dB) (470 kFCl) |
|---|---|---|---|
| medium A$_3$ | 40.8 | 40.6 | 20.0 |
| medium B$_3$ | 38.3 | 38.5 | 19.1 |
| medium C$_3$ | 33.6 | 36.2 | 18.8 |

Table 2 shows that the SNR is highest in medium A$_3$ according to the invention, followed by medium B$_3$, and the lowest in medium C$_3$. Large SNR achieves lowered noise and enhanced recording density. Medium A$_3$ has attained high SNR as compared with the media B$_3$ and C$_3$, thus enhancing recording density and improves read-write performance.

Medium A$_3$ according to the invention exhibited OW1 of 40.8 dB and OW2 of 40.6 dB, which are larger than the respective OW characteristics of medium B$_3$ and the C$_3$. Therefore, medium A$_3$ achieves higher OW characteristics than medium B$_3$ and medium C$_3$, demonstrating improvement in the read-write characteristics.

As described above, medium A$_3$ in which SiO$_2$ is not added in the cobalt layers and added in the palladium layers according to the invention has achieved higher SNR and OW characteristics and improved read-write performance as compared with medium B$_3$ described previously in the section of studied items and medium C$_3$ according to the conventional technology.

Thus, a perpendicular magnetic recording medium, in particular to a perpendicular magnetic recording medium that exhibits high recording density and excellent read-write performance, and a method of manufacturing such a medium have been described according to the present invention. Many modifications and variations may be made to the techniques and structures described and illustrated herein without departing from the spirit and scope of the invention. Accordingly, it should be understood that the [methods and apparatus] described herein are illustrative only and are not limiting upon the scope of the invention.

What is claimed is:

1. A perpendicular magnetic recording medium comprising a magnetic film formed on a nonmagnetic substrate, wherein the magnetic film is multilayered and comprises alternately laminated first magnetic layers of cobalt containing no additive and second layers of palladium, the second layers containing silicon oxide, wherein crystalline magnetic anisotropy energy of the magnetic trim is approximated by E≈Ku$_1$sin$^2$ θ+Ku$_2$sin$^4$ θ, where Ku$_1$ and Ku$_2$ are uniaxial anisotropy constants, θ is an angle between spontaneous magnetization and an axis of easy magnetization of the magnetic film, and a crystalline magnetic anisotropy constant Ku, where Ku=Ku$_1$+Ku$_2$, and the Ku and the Ku$_2$ obtained by magnetic anisotropy measurement using a torque magnetization meter under a condition of approximately saturated magnetization of the magnetic film satisfies Ku$_2$/Ku≧0.25.

2. The perpendicular magnetic recording medium according to claim 1, wherein the amount of added silicon oxide is in the concentration range of 2 to 8 mol %.

3. The perpendicular magnetic recording medium according to claim 1, wherein a thickness of the first magnetic layer is in the range of 0.2 to 0.5 nm and a thickness of the second layer is in the range of 0.6 to 1.0 nm.

4. The perpendicular magnetic recording medium according to claim 3, wherein the backing layer is composed of an alloy of CoZrNb or CoZrTa, and has a thickness in the range of 50 to 300 nm.

5. The perpendicular magnetic recording medium according to claim 1, wherein an underlayer is provided between the magnetic film and the substrate, and the magnetic film is provided directly on the underlayer.

6. The perpendicular magnetic recording medium according to claim 5, wherein the underlayer is a ruthenium film.

7. The perpendicular magnetic recording medium according to claim 5, wherein a thickness of the underlayer is in the range of 5 to 20 nm.

8. The perpendicular magnetic recording medium according claim 5, wherein a surface of the underlayer is adsorbed with oxygen.

9. The perpendicular magnetic recording medium according to claim 5, wherein an alignment control layer is provided between the substrate and the underlayer for C-axis alignment of crystal alignment of the underlayer.

10. The perpendicular magnetic recording medium according to claim 9, wherein the alignment control layer is composed by laminating a first alignment control layer and a second alignment control layer.

11. The perpendicular magnetic recording medium according to claim 10, wherein the first alignment control layer is a tantalum layer and the second alignment control layer is selected from a NiFeNbB layer, a NiFeCr layer, and a NiFeSi layer.

12. The perpendicular magnetic recording medium according to claim 11, wherein a composition of the NiFeNbB layer is in the range of 64 to 86 at % Ni, 10 to 20 at % Fe, 2 to 10 at % Nb, and 2 to 6 at % B wherein the sum of the atom percentages of Ni, Fe, Nb and B is 100 at %; a composition of the NiFeCr layer is in the range of 50 to 70 at % Ni, 10 to 20 at % Fe, and 20 to 30 at % Cr wherein the sum of the atom percentages of Ni, Fe, and Cr is 100 at %; a composition of the NiFeSi layer is in the range of 70 to 88 at % Ni, 10 to 20 at % Fe, and 2 to 10 at % Si wherein the sum of the atom percentages of Ni, Fe, and Si is 100 at %.

13. The perpendicular magnetic recording medium according to claim 10, wherein a thickness of the first alignment control layer is in the range of 1 to 5 nm and a thickness of the second alignment control layer is in the range of 5 to 30 nm.

14. The perpendicular magnetic recording medium according to claim 10, wherein a soft magnetic backing layer is provided between the substrate and the first alignment control layer.

15. A method of manufacturing a perpendicular magnetic recording medium, the method comprising:
depositing an underlayer of a ruthenium film on a nonmagnetic substrate, and
depositing a magnetic film of multilayered lamination film directly on the underlayer by alternately laminating first magnetic layers of cobalt containing no additive and second layers of palladium containing silicon oxide, wherein crystalline magnetic anisotropy energy of the magnetic trim is approximated by $E \approx Ku_1 \sin^2 \theta + Ku_2 \sin^4 \theta$, where $Ku_1$ and $Ku_2$ are uniaxial anisotropy constants, $\theta$ is an angle between spontaneous magnetization and an axis of easy magnetization of the magnetic film, and a crystalline magnetic anisotropy constant Ku, where $Ku=Ku_1+Ku_2$, and the Ku and the $Ku_2$ obtained by magnetic anisotropy measurement using a torque magnetization meter under a condition of approximately saturated magnetization of the magnetic film satisfies $Ku_2/Ku \geq 0.25$.

16. The method of manufacturing a perpendicular magnetic recording medium according to claim 15, wherein depositing the magnetic film is conducted by a sputtering method using a target of cobalt and a target of palladium containing silicon oxide in a concentration range of 2 to 8 mol %.

17. The method of manufacturing a perpendicular magnetic recording medium according to claim 15, wherein, during depositing of the underlayer, oxygen is adsorbed on a surface of the underlayer by exposing the surface of the underlayer to argon gas at a gas pressure in the range of 0.1 to 10 Pa containing oxygen in the mass flow range of 1 to 10% for a time duration in the range of 1 to 10 sec.

18. The method of manufacturing a perpendicular magnetic recording medium according to claim 15, further comprising depositing an alignment control layer prior to depositing of the underlayer, said alignment control layer comprising a first alignment control layer of tantalum and a second alignment control layer selected from a NiFeNbB layer, a NiFeCr layer, and a NiFeSi layer and producing crystal alignment of the underlayer in C-axis alignment, wherein the first alignment control layer and the second alignment control layer are laminated during deposition.

19. The method of manufacturing a perpendicular magnetic recording medium according to claim 15, further comprising depositing a backing layer in which a soft magnetic backing layer of a CoZrNb layer or a CoZrTa layer is deposited on the substrate prior to depositing the alignment control layer.

* * * * *

UNITED STATES PATENT AND TRADEMARK OFFICE
CERTIFICATE OF CORRECTION

PATENT NO. : 7,510,788 B2
APPLICATION NO. : 11/069920
DATED : March 31, 2009
INVENTOR(S) : Yasuyuki Kawada It is certified that error appears in the above-identified patent and that said Letters Patent is hereby corrected as shown below:

In the Claims Section: a Typographical error appears in claims 1 and 15, please correct as follows:

Claim 1; Column 12, Line 59:  REMOVE: "magnetic trim"

TO READ: -- magnetic film --

Claim 15; Column 14, Line 14: REMOVE: "magnetic trim"

TO READ: -- magnetic film --

Signed and Sealed this

Eighth Day of June, 2010

David J. Kappos
*Director of the United States Patent and Trademark Office*